United States Patent
Hasegawa et al.

(10) Patent No.: US 6,726,232 B2
(45) Date of Patent: Apr. 27, 2004

(54) STEERING DAMPER FOR SADDLE-TYPE VEHICLE

(75) Inventors: Yosuke Hasegawa, Saitama (JP); Takeyasu Itabashi, Saitama (JP); Kanji Hayashi, Saitama (JP); Takeshi Wakabayashi, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/252,584

(22) Filed: Sep. 24, 2002

(65) Prior Publication Data

US 2003/0127824 A1 Jul. 10, 2003

(30) Foreign Application Priority Data

Oct. 1, 2001 (JP) .................................. 2001-305362
Oct. 1, 2001 (JP) .................................. 2001-305564

(51) Int. Cl.[7] ................................................ F16F 9/14
(52) U.S. Cl. ...................................... 280/272; 188/306
(58) Field of Search ........................... 280/272, 90, 89, 280/270, 279; 180/219, 218; 74/551.1, 552.2, 551.8; 188/306, 307, 308

(56) References Cited

U.S. PATENT DOCUMENTS

| | | | | |
|---|---|---|---|---|
| 4,700,963 A | * | 10/1987 | Burns et al. ................. | 280/276 |
| 4,773,514 A | | 9/1988 | Gustafsson | |
| 5,492,033 A | * | 2/1996 | Hopey ........................ | 74/551.1 |
| 5,836,213 A | * | 11/1998 | Hopey ........................ | 74/551.2 |
| 5,927,740 A | * | 7/1999 | Hopey ........................ | 280/272 |
| 6,401,884 B2 | * | 6/2002 | Norman et al. .............. | 188/310 |

FOREIGN PATENT DOCUMENTS

| | | |
|---|---|---|
| BE | 368 551 A | 3/1930 |
| DE | 36 29 815 A | 3/1988 |
| EP | 0 023 893 A | 2/1981 |
| EP | 0 900 722 A | 3/1999 |
| JP | 63-64888 A | 3/1988 |
| JP | 7-74023 | 8/1995 |
| JP | 2593461 B2 | 12/1996 |

OTHER PUBLICATIONS

Patent Abstracts of Japan, vol. 2000, No. 21, Aug. 3, 2001.

* cited by examiner

Primary Examiner—Lesley D. Morris
Assistant Examiner—Tony Winner
(74) Attorney, Agent, or Firm—Birch, Stewart, Kolasch & Birch, LLP

(57) ABSTRACT

A steering damper for reducing the inertia of steering that is attached in a low position relative to the steering shaft. The upper portion of a steering shaft is fitted in the center of the rear of a top bridge as a fitting part and a lower screw part of a shaft is tightened in the fitting part and is integrated with the fitting part. The shaft is provided with a shaft main part having a small diameter extending in an axial direction of the steering shaft, when the shaft main part is made to pierce a turning shaft in the steering damper. A steering nut is attached to an upper screw part at the upper end and the upper screw part is tightened. The steering damper and the top bridge are fixed to the upper portion of the steering shaft by jointly fastening. Hereby, a steering nut heretofore provided under the steering damper can be omitted and a position in which the steering damper is attached can be lowered by the quantity. A rear portion of the liquid-operated steering damper is designed to fit into a space in the fuel tank so that it does not interfere with the front end of a fuel tank. The steering damper does not interfere with the capacity of the fuel tank.

20 Claims, 7 Drawing Sheets

STEERING DAMPER FOR SADDLE-TYPE VEHICLE

BACKGROUND OF THE INVENTION

CROSS-REFERENCE TO RELATED APPLICATIONS

The present application claims priority under 35 USC 119 to Japanese Patent Application No. 2001-305564 and 2001-305362 both filed on Oct. 1, 2001 the entire contents thereof is hereby incorporated by reference.

1. Field of the Invention

The present invention relates to a liquid-operated steering damper suitable for a saddle-type vehicle such as a motorcycle that is used to inhibit the run-out of a handlebar during operation.

2. Description of Background Art

As disclosed in Japanese published patent application No. 2593461, a liquid-operated steering damper that generates damping force for run-out to prevent the run-out of a handlebar by kickback and other disturbances is well-known. A liquid-operated steering damper the damping force generated by which is variable so that damping force is generated only when the force is required and no excessive damping force is generated in other cases is also well-known. For example, a liquid-operated steering damper that provides control based upon a steering angle and running speed is disclosed in Japanese published unexamined patent application No. Sho63-64888. In addition, a liquid-operated steering damper that provides control based upon the variation of a front wheel load is disclosed in Japanese published examined patent application Hei7-74023.

SUMMARY AND OBJECTS OF THE INVENTION

When a relatively heavy liquid-operated steering damper is supported by a steering portion such as a steering shaft, the inertia of steering increases. However, it is desirable that such inertia of steering should be reduced as much as possible. Since a main switch and various meters are arranged in the vicinity of the upper end of a steering shaft, it is desirable that a steering damper is arranged to provide operability for these elements. Thus, the forward visibility of a rider is impaired. The object of the invention is to overcome such problems.

To achieve the object, a steering damper for a saddle-type vehicle is provided wherein the upper end of a steering shaft is fitted to the inside of the steering damper and is interlocked with a turning member for generating damping force. The steering damper is fixed to the side of a body frame in a saddle-type vehicle on the front of the body frame wherein a head pipe is provided and the liquid-operated steering damper is coupled to the upper end of the steering shaft supported by the head pipe.

The present invention includes a part having a large diameter and a part having a small diameter that are provided on the upside of the steering shaft. The part having a small diameter is fitted to the inside of the steering damper.

The present invention includes a part having a small diameter of the steering shaft that protrudes upwardly from the steering damper and the steering damper and a top bridge arranged below the steering damper are fixed to the upside of the steering shaft by a fixing member attached to the protruding upper end by jointly fastening. The top bridge means, a part of a steering system, is a member for coupling the steering shaft and each upside of right and left front forks. A main switch is supported in the front of the top bridge.

According to the present invention, as the upper end of the steering shaft is fitted to the inside of the steering damper, is interlocked with a turning member for generating damping force and the relatively heavy steering damper is fixed to the side of the body frame, the steering shaft has only to be coupled to the turning member for generating damping force which is a relatively light part of the steering damper and the inertia of steering can be reduced though the steering damper is provided over the steering shaft.

According to the present invention, as the part having a large diameter and the part having a small diameter are provided to the upside of the steering shaft, the part having a small diameter is fitted to the inside of the steering damper and is interlocked with the turning member for generating a damping force, a part to be provided to the steering shaft to couple to the steering damper is only the part having a small diameter. Therefore, the steering shaft can be made relatively light.

According to the present invention, as the steering damper and the top bridge arranged below the steering damper are fixed to the steering shaft by the fixing member attached to the upper end of the part having a small diameter protruding upward through the steering damper by jointly fastening, a steering nut heretofore required and under the steering damper can be omitted. That is, heretofore, the top bridge is fastened to the upside of the steering shaft under the steering damper by the steering nut. However, the top bridge can be fixed by the steering damper. Therefore, a position in which the steering damper is attached can be lowered and the steering damper can be prevented from having an effect upon the operability of the main switch and the riding position and the forward visibility of a rider.

In case the steering damper utilizing hydraulic pressure as described above is arranged from the upside of a head pipe to the rear in a saddle-type vehicle in which a fuel tank is located at the back of the head pipe such as a motorcycle, the steering damper is required to be arranged so that the rear of the steering damper and the fuel tank do not interfere. At this time, in case a position in which the steering damper is attached is made high to avoid the fuel tank, the forward visibility of a rider may be influenced. In the meantime, when a position in which the steering damper is attached is lowered, the front of the fuel tank is required to be backed at the back of the rear end of the steering damper and as a result, the capacity of the fuel tank may be sacrificed. Then, it is desirable that a position in which the steering damper is attached can be lowered and the reduction in the capacity of the fuel tank can be minimized. The invention is made to realize such a result.

A steering damper for a saddle-type vehicle according to the present invention includes a steering damper that is arranged from the upside of a head pipe to the rear. The rear of the steering damper is housed in a concave portion provided at the front end of a fuel tank in a saddle-type vehicle in which the head pipe is arranged in the front of a body frame, the fuel tank is arranged at the back of the head pipe and the steering damper is provided between the body frame and a steering system.

The present invention according provides a steering damper that is a liquid-operated type configured to control a damping characteristic. A control valve for controlling the damping characteristic is provided to the rear of the steering damper housed in the concave portion.

According to the present invention, as the concave portion is provided at the front end of the fuel tank and the rear of the steering damper is housed in the concave portion, a position in which the steering damper is attached is possibly lowered, the satisfactory forward visibility of a rider can be secured and the reduction of the capacity of the fuel tank can be minimized.

According to the present invention, as the control valve is provided to the rear of the steering damper and is arranged in the concave portion of the fuel tank an external force is prevented from being applied to the control valve by the fuel tank and the control valve can be securely protected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
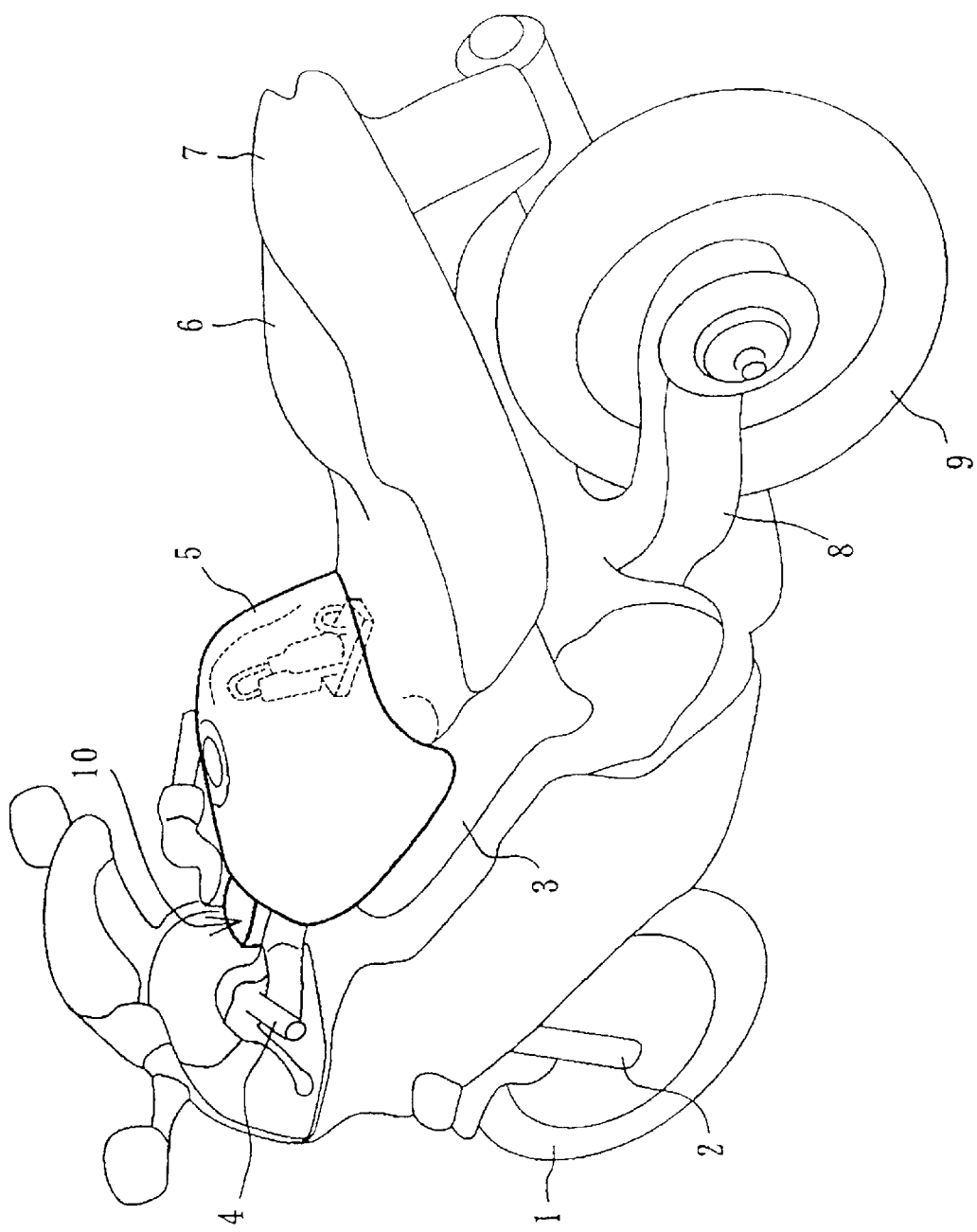
FIG. 1 is a perspective view showing a motorcycle to which an embodiment is applied.

As shown in FIG. 1, the upper portion of a front fork 2 that supports a front wheel 1 at the lower end is coupled to the front of a body frame 3 and can be turned by a handlebar 4. A fuel tank 5 is supported on the body frame 3. A seat 6 is provided together with a rear cowl 7, a rear swing arm 8 and a rear wheel 9.

Figure 2:
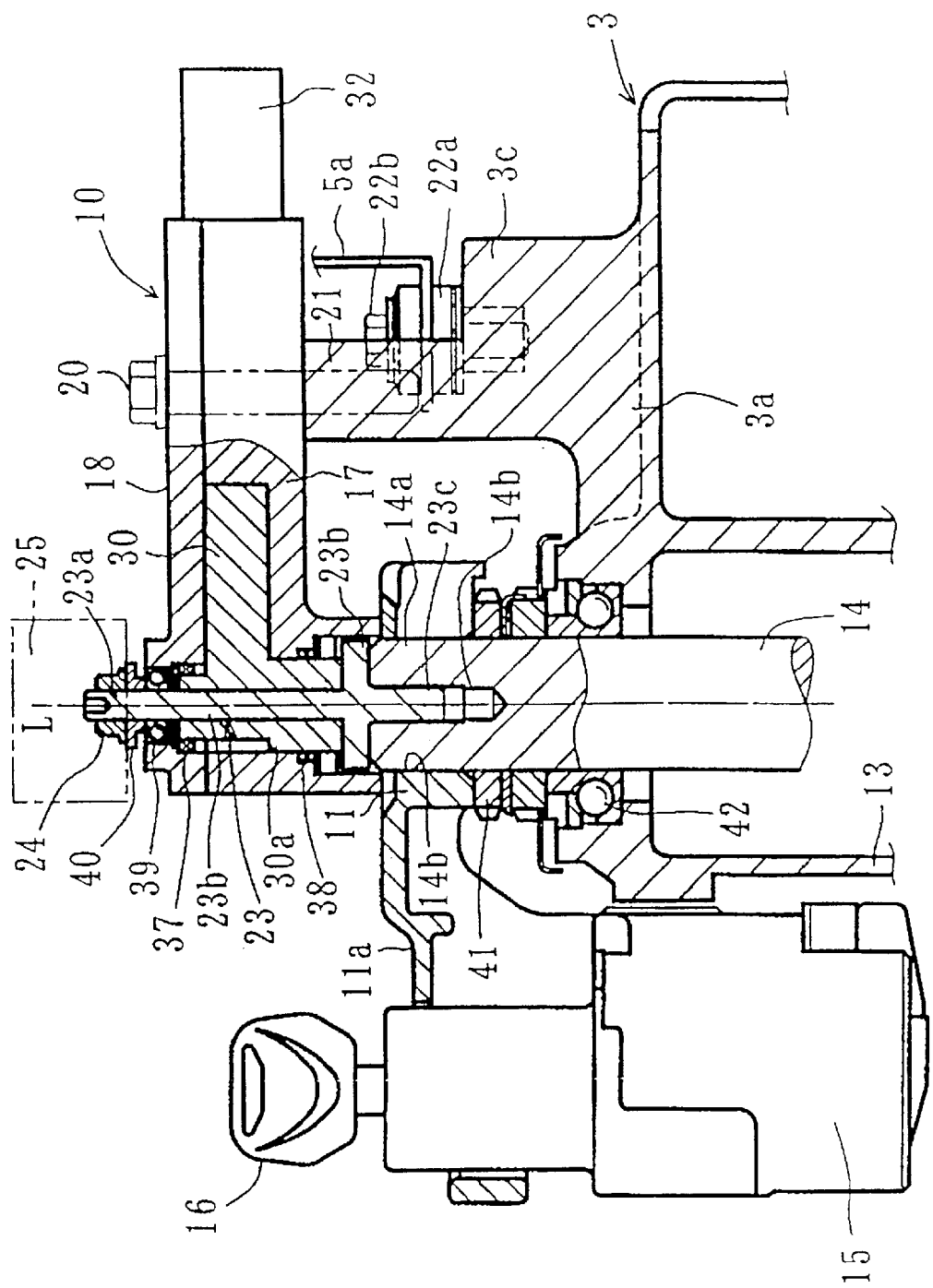
FIG. 2 is a side view showing the front of a body equivalent to a steering damper.
Figure 3:
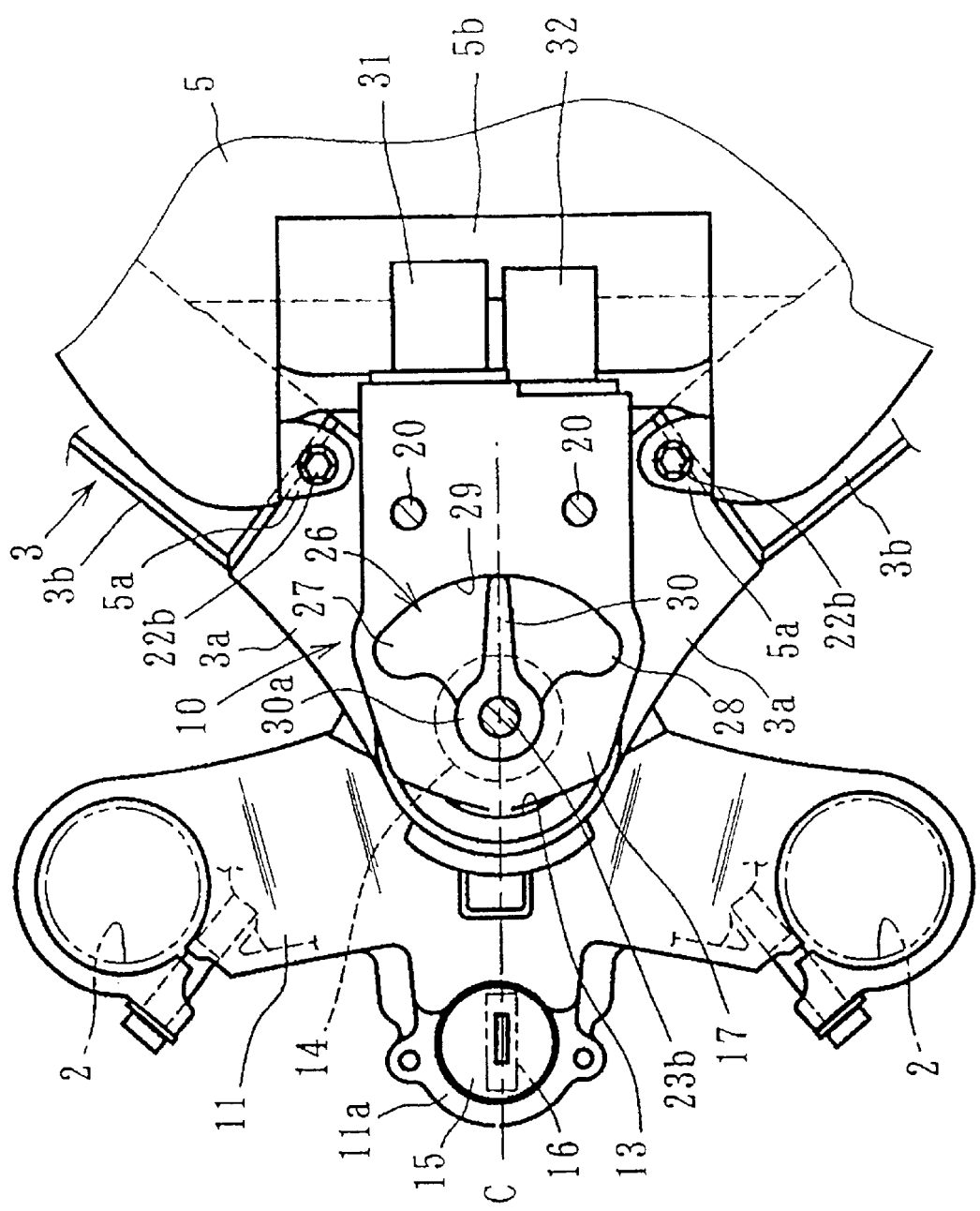
FIG. 3 is a plan view showing the same part.

Next, the steering damper will be described. As shown in FIGS. 2 and 3, the steering damper 10 is arranged above a top bridge 11 to which a handlebar 4 shown in FIG. 1 is attached. The top bridge 11 is supported by a head 3a which is a front end part of the body frame 3 via a shaft. The top bridge 11 is integrated with a lower bottom bridge, not shown, with a steering shaft 14 supported by a head pipe 13 mounted between the top bridge and the bottom bridge. The top bridge 11, the bottom bridge and the steering shaft 14 are integrally turned.

The head pipe 13 in this embodiment is a cylinder vertically integrated with the center of the front of the head 3a. However, the head pipe 13 may be also a well-head known head pipe formed by a pipe member separate from the body frame beforehand and integrated with the front end of the body frame by welding or by other means. The body frame 3 is provided with the head 3a and a pair of right and left main frames 3b respectively extending rearwardly from the rear end as shown in FIG. 3.

Each upside of a pair of right and left front forks 2 is supported by the top bridge 11 and the bottom bridge. A stay 11a integrally protruding forward is provided in the center of the front of the top bridge 11. A main switch 15 is integrated with a handlebar lock and is supported by the stay and is turned on/off and unlocked by a key 16.

The steering damper 10 is arranged to be longer longitudinally on the head 3a along the center C of the body shown in FIG. 3 rearwardly from the upside of the head pipe 13. The steering damper 10 equivalent to this embodiment is a liquid-operated damper for preventing kickback and is provided with the body 17 and a cap 18 shown in FIG. 2. The rear side of the steering damper 10 is fastened onto a boss 21 protruding upwardly from the upper surface of the head 3a of the body frame 3 in the vicinity of the head pipe 13 and integrated with the upper surface of the head by a bolt 20. At this time, the body 17 and the cap 18 are integrated by jointly fastening. A nut is formed in the boss 21 beforehand.

A stage 3c made higher by one step is formed on the upper surface of the rear of the head 3a on both sides of the boss 21 and a stay 5a formed on both sides of the front end of the fuel tank 5 is flexibly attached here via rubber 22a by a bolt 22b. As shown in FIG. 3, the stay 5a protrudes from both sides of the front end of a concave portion 5b provided in the center of the front of the fuel tank 5 with the concave portion open forward and upwardly to the side of the center of the body and is overlapped with the stage 3c in the vicinity of a part in which the front end of the main frame 3b is connected.

As shown in FIG. 2, a shaft 23 pierces the front of the steering damper 10 with the axis vertical and the shaft is supported by the steering damper 10 so that the shaft can be turned. In the shaft 23, an upper screw part 23a at the upper end, a shaft main part 23b in the middle, a flange 23c in a lower part and a lower screw part 23d are integrated, the upper screw part 23a pierces the cap 18 and protrudes upwardly and a steering nut 24 which is an example of a fixing member in the invention is attached here.

The flange 23c and the lower screw part 23d are located under the body 17, and the lower screw part 23d is fitted into a screw hole 14b formed in the axial direction of a fitting part 14a fitted into a mounting hole 11b in the center of the rear of the top bridge 11 in an upper part of the steering shaft 14 so that the shaft 23 and the steering shaft 14 are integrally turned.

The flange 23c is touched to the upper end face of the fitting part 14a along the bottom of the body 17 and the outside diameter is substantially the same as that of the fitting part 14a of the steering shaft 14. The shaft 23 extends in the axial direction of the steering shaft 14, forms a part of the steering shaft and the flange 23c forms a part having a large diameter formed in the upper part of the steering shaft together with the fitting part 14a. In the meantime, the diameter of the shaft main part 23b is smaller than that of the fitting part 14a and the shaft main part forms a part having a small diameter formed in the upper part of the steering shaft.

The steering damper 10 shown in FIG. 3 shows the structure on the side of the body 17 except the cap 18. A substantially fan-shaped liquid chamber 26 is formed in a concave portion provided to the body 17. A right liquid chamber 27 and a left liquid chamber 28 are provided together with a wing-shaped partition 30 for partitioning these right and left liquid chambers. A turning shaft 30a at one end is integrated with the shaft main part 23b and is turned integrally with the shaft main part 23b. The partition 30 is a turning member for generating a damping force. A control valve 31 is provided together with a controller 32. The control valve 31 and the controller 32 protrude backwardly from the rear end of the steering damper 10 and are housed in the concave portion 5b of the fuel tank 5 together with the rear end of the steering damper 10.

A steering lock 15, the steering shaft 14 and the shaft 23 are substantially located on the same straight line based upon the center line C of the body, the steering lock 15, the control valve 31 and the controller 32 are located on the reverse sides longitudinally with the steering damper 10 therebetween. The control valve 31 and the controller 32 are arranged on both sides with the center line C of the body therebetween with the control valve 31 and the controller 32 attached to the rear of the body 17.

Figure 4:
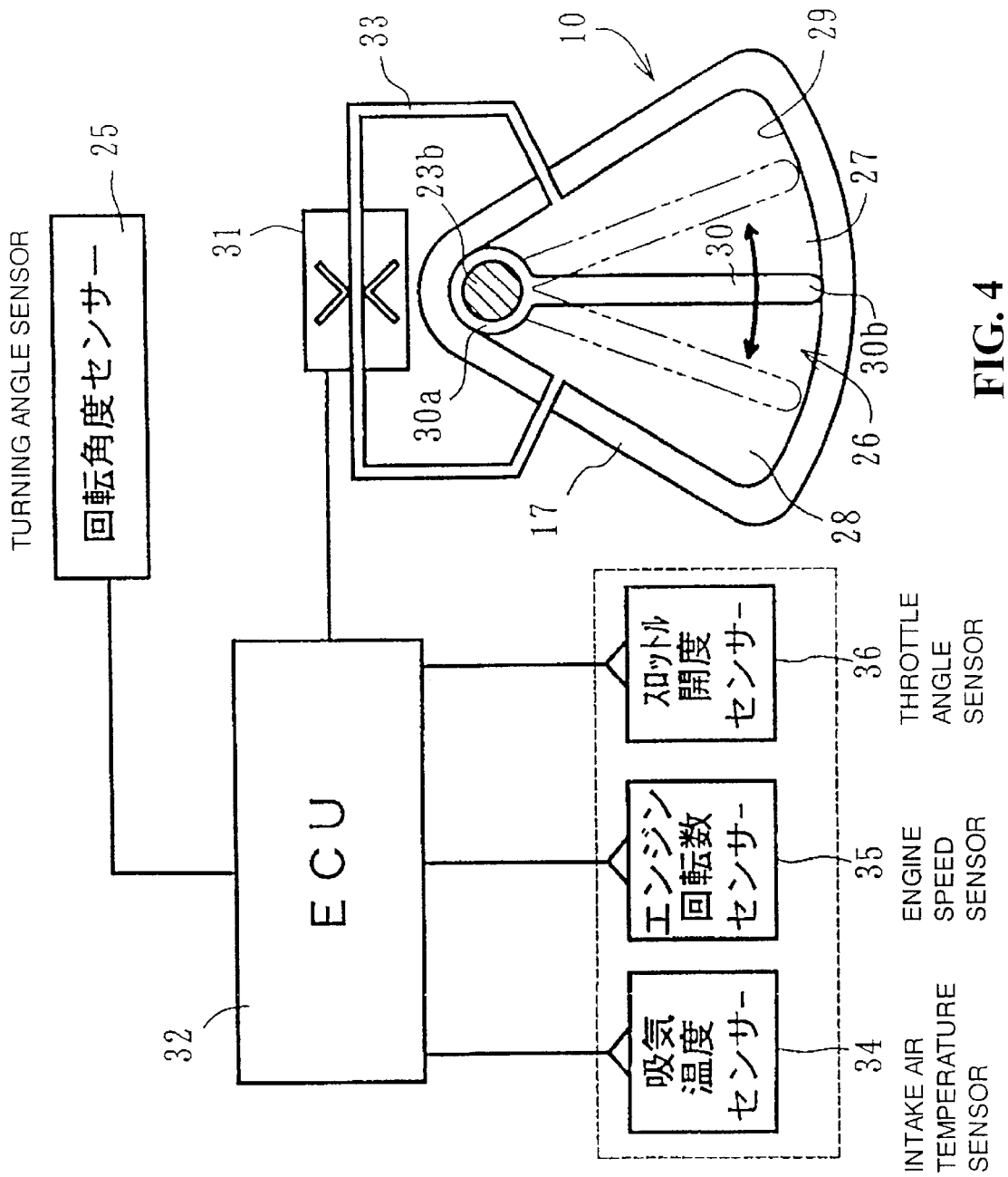
FIG. 4 shows the schematic structure of the steering damper.

FIG. 4 schematically shows the structure of the steering damper 10, the fan-shaped liquid chamber 26 expands backwardly and is provided inside the steering damper 10. The shaft main part 23b is located in a position equivalent to a pivot of a fan and the inside of the steering damper is divided into the right liquid chamber 27 and the left liquid chamber 28 by the partition 30 integrally extending backwardly from the shaft main part 23 in the shape of a wing. That is, the steering damper 10 is a liquid-operated rotary member provided with a turning member for generating a damping force.

The end 30b of the partition 30 forms a sliding face and is slid on the internal face of an arc-shaped wall 29 of the liquid chamber 26. Incompressible hydraulic fluid such as oil is filled in the right liquid chamber 27 and the left liquid chamber 28 and communicates via a bypass passage 33. Therefore, when the front wheel is horizontally oscillated, hydraulic fluid moves into the expanded liquid chamber on the reverse side via the bypass passage 33 from the liquid chamber the volume of which is reduced by the turn (shown by a virtual line in FIG. 3) of the partition 30 interlocked with the front wheel via the steering shaft 14 and the shaft 23 and corresponds to the variation in volume of the liquid chambers.

The control valve 31 is provided to the middle of the bypass passage 33. The control valve 31 is provided with a variable restriction passage for generating a damping force. Therefore, the movement of hydraulic fluid according to the variation of the volume in the right and left liquid chambers is limited by varying the cross section of the restriction passage. Thus, a variable damping force can be generated. In this embodiment, the restriction passage is formed by a linear solenoid that linearly moves an actuator.

The control valve 31 is controlled by the controller 32. The controller 32 is formed by an ECU and other members, a turning angle based upon a signal detected by a turning angle sensor 25 shown in FIG. 2 that is attached to the upper end of the shaft 23 is differentiated by time. A turning angular velocity is calculated while the restriction of the control valve 31 is varied according to the magnitude of the turning angular velocity and the damping force is adjusted to an appropriate value. For a sensor signal for correction, each signal detected by an intake air temperature sensor 34, a throttle angle sensor 35 and an engine speed sensor 36 for example composing a group of sensors of an electronic fuel injection system is also input if necessary and a damping force is corrected.

In FIG. 2 seals 37 and 38 are provided between the internal face of a through hole and the peripheral surface of the turning shaft 30a which is respectively formed in the body 17 and the cap 18. The lower end of the turning shaft 30a protrudes downwardly from the bottom of the body 17 and is touched to the flange 23c. A ball bearing 39 is provided between the internal face of the through hole and the shaft main part 23b which are formed in the cap 18. A flange collar 40 is provided together with a nut 41 for positioning the upper portion of the steering shaft 14 for the upside of the head pipe 13 and for positioning a ball bearing 42.

Next, the action of this embodiment will be described. As shown in FIG. 2, when the fitting part 14a of the steering shaft 14 is fitted into the mounting hole 11b of the top bridge 11 and the lower screw part 23d of the shaft 23 is tightened into the screw hole 14b, the shaft 23 is attached to the fitting part 14a and is integrated with the fitting part, the flange 23c is touched to the end face of the fitting part 14a and the shaft main part 23b extends upwardly along an axis of the steering shaft 14 from the fitting part 14a.

Then, the shaft main part 23b is made to pierce the turning shaft 30a of the steering damper 10 from a lower part to an upper part, the shaft main part 23b and the turning shaft 30a are connected so that they can be integrally turned, the upper screw part 23a protrudes further upwardly from the cap 18 and is tightened by the steering nut 24 via the flange collar 40. Then, the tightening force of the steering nut 24 is transmitted to the flange collar 40, the ball bearing 39, the cap 18 and the turning shaft 30a and presses the turning shaft 30a on the flange 23c.

Hereby, the shaft 23 which is a part of the steering shaft 14 and the partition 30 which is a turning member for generating a damping force in the steering damper 10 are integrated via its turning shaft 30a. The top bridge 11 is also fixed to the fitting part 14a of the steering shaft 14. Afterward, when the rear side of the steering damper 10 is attached to the boss 21 on the head 3a by the bolt 20, the assembly of the steering damper 10 is completed.

As described above, as the relatively heavy steering damper 10 has only to be fixed to the side of the body frame 3 by the bolt 20 and the steering shaft 14 has only to be coupled to the partition 30 which is a turning member for generating a damping force and which is a relatively light part of the steering damper 10, the inertia of steering can be reduced though the steering damper 10 is provided over the steering shaft 14.

As the shaft 23 is coupled to the upside of the steering shaft 14, the fitting part 14a and the flange 23c, respectively, which are parts having a large diameter and the shaft main part 23b which is a part having a small diameter are provided. The shaft main part 23b is fitted into the inside of the steering damper 10 and is connected to the turning shaft 30a so that they can be integrally turned. A part to be provided to the steering shaft 14 to couple to the steering damper 10 is only the shaft 23 having a small diameter as a whole. Therefore, the steering shaft 14 can be relatively light.

Further, as the steering damper 10 and the top bridge 11 that are arranged below the steering damper are fixed to the steering shaft 14 by jointly fastening by attaching the steering nut 24 to the upper screw part 23a protruding upwardly through the steering damper 10, a steering nut under the steering damper required heretofore can be omitted.

That is, heretofore, the top bridge 11 is fastened to the upside of the steering shaft 14 by the steering nut under the steering damper 10. However, in this embodiment, the steering damper 10 and the top bridge 11 can be fixed to the steering shaft 14 by the steering nut 24 by jointly fastening. Therefore, a position in which the steering damper 10 is attached can be lowered and the steering damper can be prevented from having an effect upon the operability of the main switch 15, a riding position of a rider (not shown) and forward visibility.

The invention is not limited to the embodiment and various variations and application are allowed in the principle of the invention. For example, the object to which the invention is applied is not limited to the motorcycle. The invention may be applied to a saddle-type vehicle provided with a steering system composed of a head pipe, a steering shaft, a top bridge. Thus, the invention may be applied to other vehicles such as a buggy. In the embodiment, the steering shaft 14 and the shaft 23 are separate. However, the shafts may also be integrated. Further, for the steering damper, various well-known liquid-operated rotaries can be applied.

Figure 5:
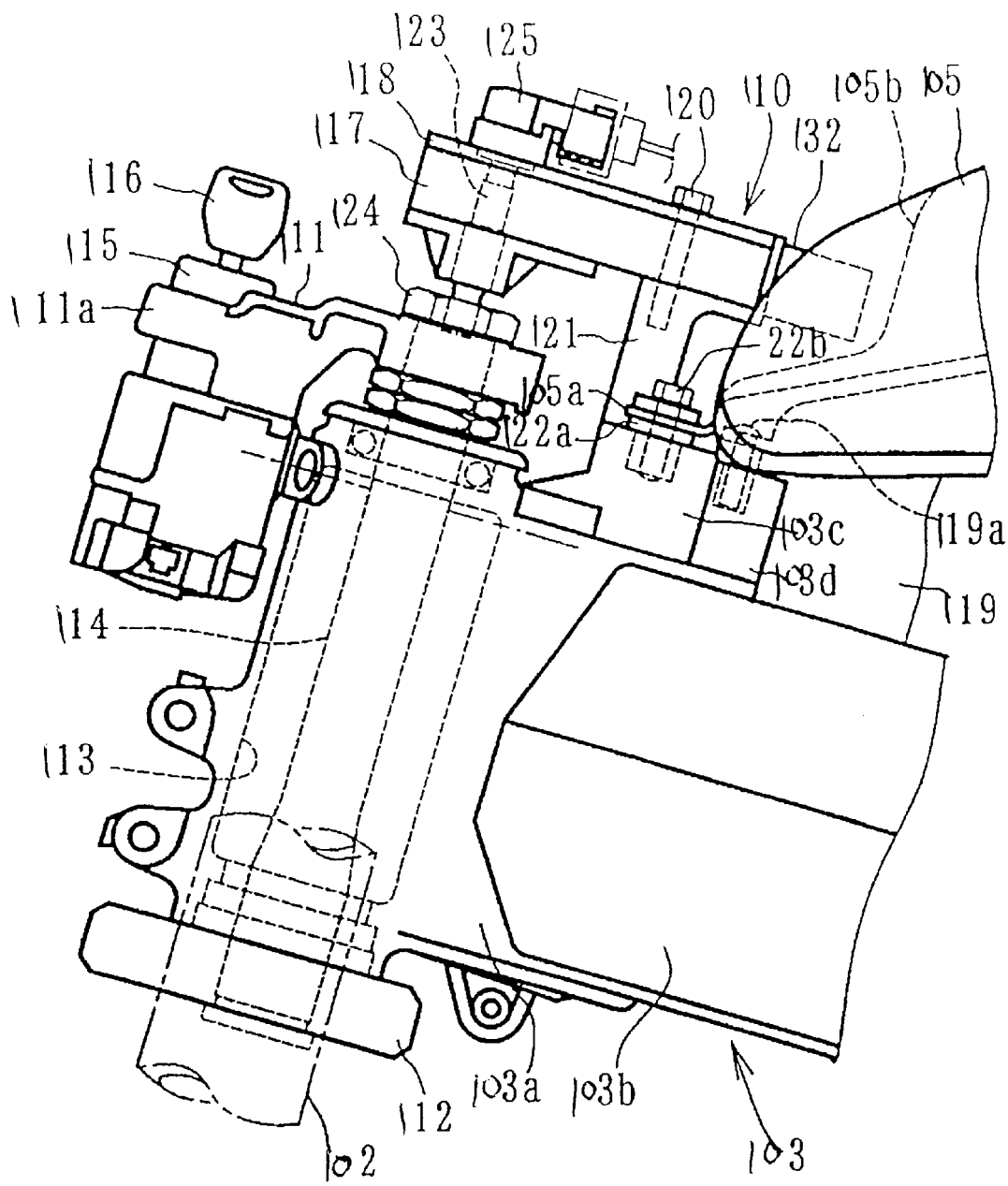
FIG. 5 is a side view showing the front of a body equivalent to a steering damper according to another embodiment.
Figure 6:
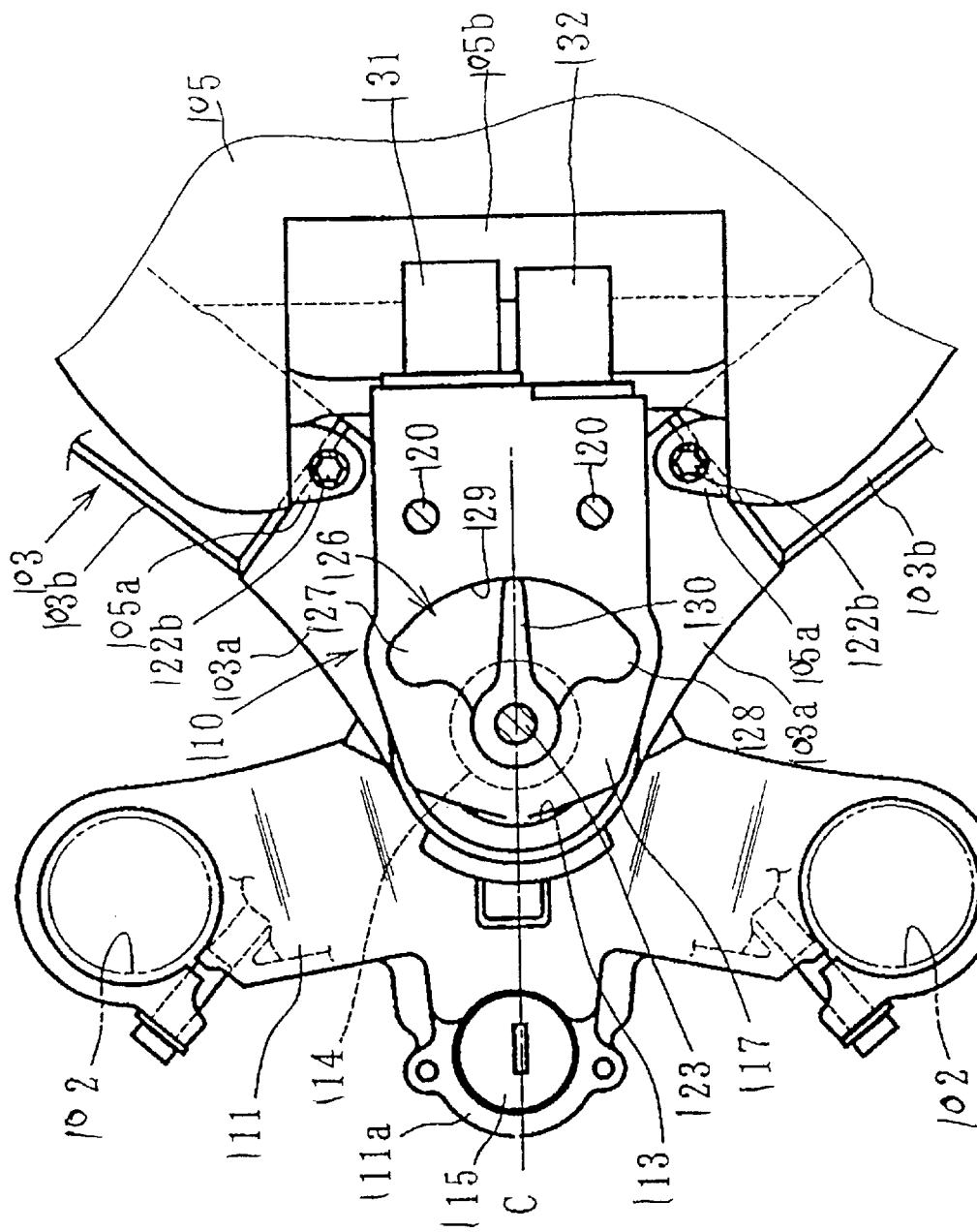
FIG. 6 is a plan view of FIG. 5 showing the same part.

Next, a second embodiment of the steering damper will be described. As shown in FIGS. 5 and 6, the steering damper 110 is arranged above a top bridge 111 to which a handlebar 104 is attached. The top bridge 111 is supported by a head 103a which is a front end part of the body frame 103 via a shaft. The top bridge 111 is integrated with a lower bottom bridge 112 with a steering shaft 114 supported by a head pipe 113 between the top bridge and the bottom bridge. The top bridge 111, the bottom bridge 112 and the steering shaft 114 are integrally turned.

The head pipe 113 in this embodiment is a cylinder vertically integrated with the center of the front of the head 103a. However, the head pipe 113 may be also a well-known head pipe formed by a pipe member separate from the body frame beforehand and integrated with the front end of the body frame by welding and by other means. The steering damper 110 is arranged over the head 103a along the center C shown in FIG. 6 of the body from the upside of the head pipe 113 to the rear longer longitudinally.

Each upside of a pair of right and left front forks 102 is supported by the top bridge 111 and the bottom bridge 112. The head pipe 113 is a pipe-like part integrated with the head 103a of the body frame 103. The body frame 103 is provided with the head 103a and a pair of main frames 103b extend rearwardly from both sides of the rear end of the head as shown in FIG. 6. A stay 111a integrally protruding forwardly is provided in the center of the front of the top bridge 111, a main switch 115 is integrated with a handlebar lock and is supported by the stay and is turned on/off and unlocked by a key 116.

The steering damper 110 equivalent to this embodiment is a liquid-operated damper for preventing kickback and is provided with the body 117 and a cap 118 shown in FIG. 5. The rear side is fastened onto a boss 121 protruding upwardly from the upper surface of the head 103a of the body frame 103 in the vicinity of the head pipe 113 and integrated with the upper surface of the head by a bolt 120. At this time, the body 117 and the cap 118 are integrated by jointly fastening. A nut is formed in the boss 121 beforehand.

A stage 103c made higher by one step is formed on the upper surface of the rear of the head 103a on both sides of the boss 121. A stay 105a is formed on both sides of the front end of the fuel tank 105 and is flexibly attached here via rubber 122a by a bolt 122b. As shown in FIG. 6, the stay 105a protrudes from both sides of the front end of a concave portion 105b provided in the center of the front of the fuel tank 105 with the concave portion open forwardly and upwardly to the side of the center of the body and is overlapped with the stage 103c in the vicinity of a part in which the front end of the main frame 103b is connected.

As shown in FIG. 5 again, an air cleaner 119 is arranged under the fuel tank 105 and the front end is also attached to a mounting part 3d at the rear end of the head 103a under the concave portion 105b by a bolt 119a. The mounting part 103d is hung rearwardly and under the concave portion 105b continuously from the stage 103c.

A shaft 123 pierces the front of the steering damper 110 with the axis of the shaft vertical in FIG. 5 and is supported by the steering damper 110 so that the shaft can be turned. The lower end of the shaft 123 protrudes downwardly from the body 117 of the steering damper 110, is fitted to the upper end of the steering shaft 114 and is coupled so that the shaft and the steering shaft can be integrally turned. The shaft 123 and the steering shaft 114 are arranged coaxially.

A steering nut 124 fastens the upper end of the steering shaft 114 to the top bridge 111. The lower end of the shaft 123 pierces a hole formed in the center of the steering nut 124.

The upside of the shaft 123 pierces a cap 118 upwardly and the upper end is inserted into a turning angle sensor 125 fixed on the cap 118. The turning angle sensor 125 is a well-known sensor that uses electric resistance. Other sensors may be provided. The turning angle sensor 125 detects a turning angle of a relative turn between the shaft 123 and the body side 117 of the steering damper 110 for detecting the turning angle of the steering shaft 114 turned integrally with the shaft 123 and inputs a detection signal to a controller described later.

The steering damper 110 shown in FIG. 6 shows the structure on the side of the body 117 except the cap 118. A substantially fan-shaped liquid chamber 126 is formed in a concave portion provided to the body 117. A right liquid chamber 127, a left liquid chamber 128 and a wing-shaped partition 130 for partitioning these right and left liquid chambers are provided with one end that is integrated with the shaft 123 and is turned integrally with the shaft 123. A control valve 131 and a controller 132 are provided. The control valve 131 and the controller 132 protrude rearwardly from the rear end of the steering damper 110 and are housed in the concave portion 105b of the fuel tank 5 together with the rear end of the steering damper 110.

A steering lock 115, the steering shaft 114 and the shaft 123 are substantially located on the same straight line based upon the center line C of the body. The steering lock 115, the control valve 131 and the controller 132 are located on the reverse sides longitudinally with the steering damper 110 therebetween. The control valve 131 and the controller 132 are arranged on both sides with the center line C of the body therebetween. The control valve 131 and the controller 132 are attached to the rear of the body 117.

Figure 7:
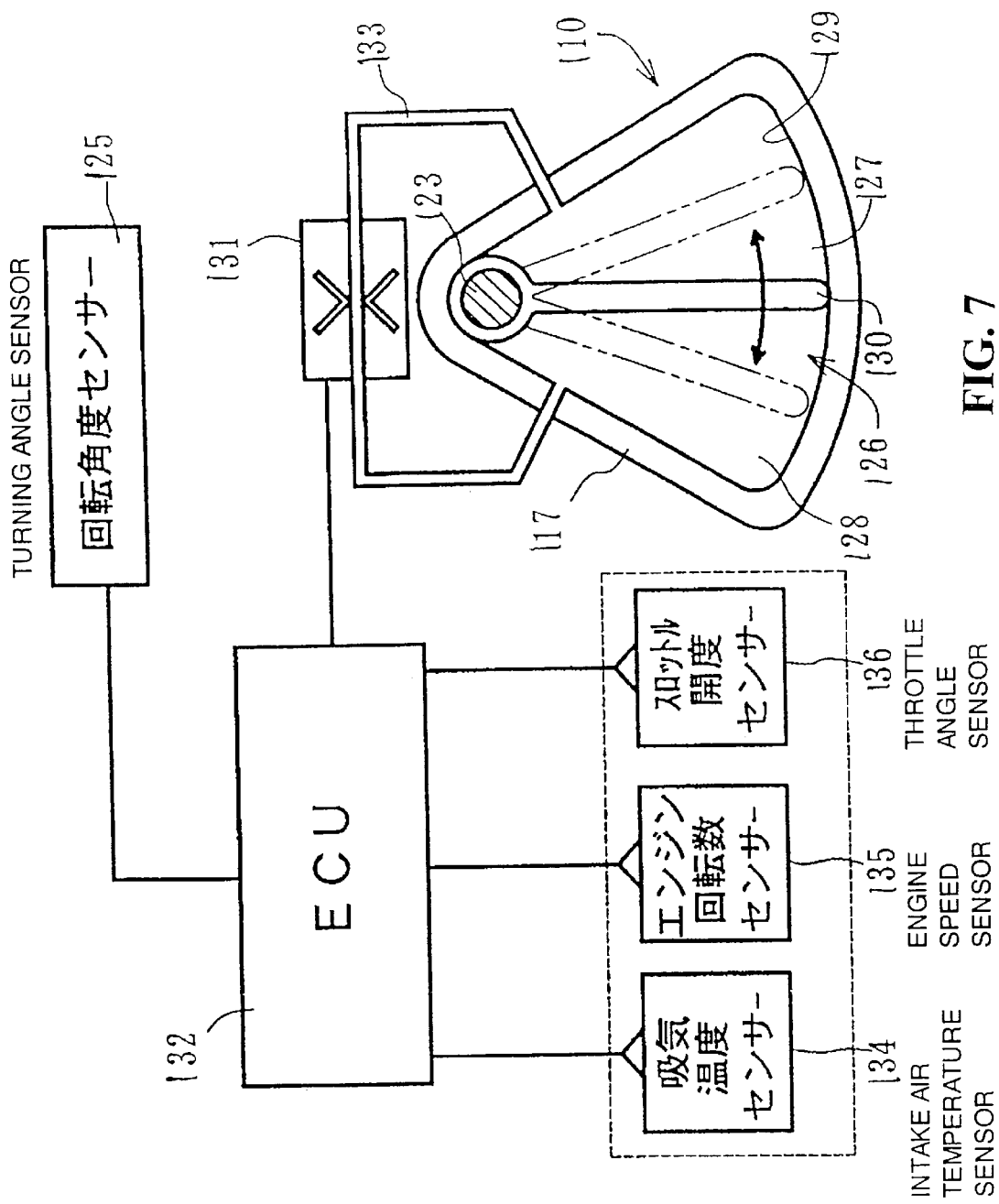
FIG. 7 shows the schematic structure of the steering damper according to the second embodiment.

FIG. 7 schematically shows the structure of the steering damper 110, the fan-shaped liquid chamber 126 expands rearwardly and is provided inside the steering damper 110. The shaft 123 is located in a position equivalent to a pivot of a fan and the inside of the steering damper is divided into the right liquid chamber 127 and the left liquid chamber 128 by the partition 130 integrally extending rearwardly from the shaft 123 in the shape of a wing.

The end of the partition 130 forms a sliding face and is slid on the internal face of an arc-shaped wall 129 of the liquid chamber 126. Incompressible hydraulic fluid such as oil is filled in the right liquid chamber 127 and the left liquid chamber 128 and communicates via a bypass passage 133. Therefore, when the front wheel is horizontally oscillated, hydraulic fluid moves into the expanded liquid chamber on the reverse side via the bypass passage 133 from the liquid chamber the volume of which is reduced by the turning (shown by a virtual line in FIG. 6) of the partition 130 interlocked with the front wheel via the steering shaft 114 and the shaft 123 and corresponds to the variation in volume of the liquid chambers.

The control valve 131 is provided on the middle of the bypass passage 133. The control valve 131 is provided with a variable restriction passage for generating a damping force. Therefore, the movement of hydraulic fluid according to the variation of the volume in the right and left liquid chambers is limited by varying the cross section of the restriction passage. Thus, a variable damping force can be generated. In this embodiment, the restriction passage is formed by a linear solenoid that linearly moves an actuator.

The control valve 131 is controlled by the controller 132. The controller 132 is formed by ECU and others, a turning angle based upon a signal detected by a turning angle sensor 125 is differentiated by time, turning angular velocity is calculated, the restriction of the control valve 131 is varied according to the magnitude of the turning angular velocity and a damping force is adjusted to an appropriate value. For a sensor signal for correction, each signal detected by an intake air temperature sensor 134, a throttle angle sensor 135 and an engine speed sensor 136 for example composing a group of sensors of an electronic fuel injection system is also input if necessary and damping force is corrected.

Next, the action of this embodiment will be described. As shown in FIGS. 5 and 6, as the steering damper 110 is arranged from the upside of the head pipe 113 to the rear and the rear of the steering damper 110 is housed in the concave portion 105b provided at the front end of the fuel tank 105, a position in which the steering damper 110 is attached is brought close to the upper end of the head 103a. Thus, the position of the steering damper 110 is possibly lowered and a satisfactory forward visibility of a rider can be secured. In addition, as only a part of the fuel tank that interferes with the rear end of the steering damper 110 is made to have the concave portion 105b without backing the whole front end part of the fuel tank 105, a reduction in the capacity of the fuel tank 105 can be minimized.

As the control valve 131 protrudes rearwardly from the rear end of the steering damper 110 and is arranged in the concave portion 105b of the fuel tank 105 together with the rear end of the steering damper 110, an external force is prevented from being applied to the control valve 131 by the fuel tank 105 and the control valve can be securely protected. In addition, as the controller 132 is also housed in the concave portion 105b together with the control valve 131 and is protected, the protection of the controller 132 is also secured. However, the controller 132 can be also arranged remotely in another place via electric wire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper for a vehicle in which a head pipe is provided in a front portion of a body frame and a liquid-operated steering damper is coupled to an upper end of a steering shaft supported by the head pipe comprising:
   an upper end of the steering shaft is fitted into an inside of the steering damper and is interlocked with a turning member for generating a damping force; and
   a steering damper is fixed to a side of the body frame.

2. The steering damper for a vehicle according to claim 1, wherein:
   a part having a large diameter and a part having a small diameter are provided to the upper portion of the steering shaft; and
   the part having a small diameter is fitted into the inside of the steering damper.

3. The steering damper for a vehicle according to claim 2, wherein:
   the part having a small diameter of the steering shaft protrudes upwardly from the steering damper; and
   the steering damper and a top bridge arranged below the steering damper are fixed to the upper portion of the steering shaft by a fixing member attached to the protruding upper end by jointly fastening.

4. The steering damper for a vehicle according to claim 1, wherein the steering damper includes a liquid chamber divided into a first section and a second section with a partition being disposed therebetween.

5. The steering damper for a vehicle according to claim 4, and further including a control valve and a controller operatively connected to said liquid chamber for controlling the steering damper.

6. The steering damper for a vehicle according to claim 4, wherein said liquid chamber contains an incompressible hydraulic fluid wherein as a wheel of the saddle-type vehicle is horizontally oscillated, hydraulic fluid moves into an expanded liquid chamber for providing a variable damping force.

7. The steering damper for a vehicle according to claim 6, wherein a turning angular velocity is calculated for controlling the magnitude of the damping force based on a turning angle.

8. A steering damper for a vehicle comprising:
   a body frame;
   a head pipe operatively provided on a front portion of the body frame;
   a steering shaft operatively positioned within said head pipe, said steering shaft including an upper end;
   a liquid-operated steering damper operatively coupled to the upper end of the steering shaft;
   the upper end of the steering shaft being operatively connected to the steering damper and being interlocked with a turning member for generating a damping force; and
   a steering damper being fixed to a side of the body frame.

9. The steering damper for a vehicle according to claim 8, wherein:
   a part having a large diameter and a part having a small diameter are operatively mounted on the upper portion of the steering shaft; and
   the part having a small diameter is fitted relative to the steering damper.

10. The steering damper for a vehicle according to claim 9, wherein:
   the part having a small diameter of the steering shaft protrudes upwardly from the steering damper; and
   the steering damper and a top bridge arranged below the steering damper are fixed to the upper portion of the steering shaft by a fixing member attached to the protruding upper end by jointly fastening.

11. The steering damper for a vehicle according to claim 8, wherein the steering damper includes a liquid chamber divided into a first section and a second section with a partition being disposed therebetween.

12. The steering damper for a vehicle according to claim 11, and further including a control valve and a controller operatively connected to said liquid chamber for controlling the steering damper.

13. The steering damper for a vehicle according to claim 11, wherein said liquid chamber contains an incompressible hydraulic fluid wherein as a wheel of the vehicle is horizontally oscillated, hydraulic fluid moves into an expanded liquid chamber for providing a variable damping force.

14. The steering damper for a vehicle according to claim 13, wherein a turning angular velocity is calculated for controlling the magnitude of the damping force based on a turning angle.

15. A steering damper for a vehicle in which a head pipe is arranged in a front portion of a body frame, a fuel tank is arranged at a back portion of the head pipe and a steering damper is provided between the body frame and a steering system comprising:

the steering damper is arranged relative to an upper portion of the head pipe to the rear; and a rear of the steering damper is housed in a concave portion provided at the front end of the fuel tank.

16. The steering damper for a vehicle according to claim 15, wherein:

the steering damper is liquid-operated for controling a damping characteristic; and a control valve for controlling the damping characteristic is provided to a rear of the steering damper housed in the concave portion.

17. The steering damper for a vehicle according to claim 15, wherein the steering damper includes a liquid chamber divided into a first section and a second section with a partition being disposed therebetween.

18. The steering damper for a vehicle according to claim 17, and further including a control valve and a controller operatively connected to said liquid chamber for controlling the steering damper.

19. The steering damper for a vehicle according to claim 17, wherein said liquid chamber contains an incompressible hydraulic fluid wherein as a wheel of the saddle-type vehicle is horizontally oscillated, hydraulic fluid moves into an expanded liquid chamber for providing a variable damping force.

20. The steering damper for a vehicle according to claim 18, wherein a turning angular velocity is calculated for controlling the magnitude of the damping force based on a turning angle.

* * * * *